US006700342B2

(12) United States Patent
Hampo et al.

(10) Patent No.: US 6,700,342 B2
(45) Date of Patent: Mar. 2, 2004

(54) METHOD AND APPARATUS FOR HIGH PERFORMANCE PERMANENT MAGNET MOTOR SPEED CONTROL WITH LIMITED POSITION INFORMATION

(75) Inventors: Richard J. Hampo, Plymouth, MI (US); Yifan Zhao, Belleville, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 0 days.

(21) Appl. No.: 10/208,251

(22) Filed: Jul. 29, 2002

(65) Prior Publication Data

US 2003/0030395 A1 Feb. 13, 2003

Related U.S. Application Data

(60) Provisional application No. 60/309,652, filed on Aug. 2, 2001.

(51) Int. Cl.[7] .................................................. H02P 7/00
(52) U.S. Cl. .................... 318/432; 318/139; 318/254; 318/803; 318/811
(58) Field of Search ........................... 318/432, 803, 318/716, 811, 805, 139, 801, 439, 254

(56) References Cited

U.S. PATENT DOCUMENTS

| 3,611,079 | A | * | 10/1971 | Ivey | 318/17 |
|---|---|---|---|---|---|
| 3,675,104 | A | * | 7/1972 | Allison et al. | 388/819 |
| 4,376,261 | A | * | 3/1983 | von der Heide et al. | 318/254 |
| RE35,124 | E | * | 12/1995 | Erdman et al. | 318/599 |
| 5,677,611 | A | | 10/1997 | Yoshihara et al. | 318/803 |
| 5,854,547 | A | | 12/1998 | Nakazawa | 318/716 |
| 5,880,574 | A | | 3/1999 | Otsuka et al. | 318/811 |
| 5,965,995 | A | | 10/1999 | Seibel et al. | 318/805 |
| 6,002,221 | A | | 12/1999 | Ochiai et al. | 318/139 |
| 6,021,251 | A | | 2/2000 | Hammer et al. | 388/801 |
| 6,137,251 | A | | 10/2000 | Huang et al. | 318/439 |

FOREIGN PATENT DOCUMENTS

| EP | 0 645 879 A1 | 3/1995 |
|---|---|---|
| EP | 0 944 164 A1 | 9/1999 |

* cited by examiner

Primary Examiner—Karen Masih
(74) Attorney, Agent, or Firm—Seed IP Law Group PLLC

(57) ABSTRACT

A control system for a permanent magnet motor having low-resolution speed measurement is taught. The control system is comprised of a speed regulator, voltage regulator and current regulator. The speed regulator uses a speed command and a measured speed for calculating a desired motor voltage; the voltage regulator uses a voltage command and an applied motor voltage for calculating a motor current command; and the current regulator uses a current command and a motor phase current for calculating a desired motor voltage for use by said voltage regulator; thereby providing a low resolution speed measurement to be used in a high performance application.

39 Claims, 4 Drawing Sheets

METHOD AND APPARATUS FOR HIGH PERFORMANCE PERMANENT MAGNET MOTOR SPEED CONTROL WITH LIMITED POSITION INFORMATION

BACKGROUND OF THE INVENTION

1. Field of the Invention

The present invention relates to the field of electronics. More specifically, the present method and apparatus relate to methods and systems for controlling a permanent magnet motor having a speed sensor with poor or coarse resolution.

2. Description of the Related Art

Permanent magnet motors are generally regarded today as an interesting solution for a wide range of inverter-fed variable-speed drives. Advantages of these motors in comparison to state of the art asynchronous motors include lower losses and higher torque density.

The motor control industry as a whole is a strong and aggressive sector. In order for members of the industry to remain competitive, they must not only reduce costs imposed by governments and power plant lobbies, but also answer to power consumption reduction and EMI radiation reduction issues. One consequence of these constraining factors is the need of enhanced control strategies for permanent magnet motors.

Present permanent magnet motor control strategies typically require high-resolution sensors. A permanent magnet motor has available a number of various kinds of sensors that can be used, such as optical encoders which are subject to contamination, and resolvers which require a great deal of circuitry. Such sensors are expensive and are not very reliable. Accordingly, there is a need for a control strategy that provides excellent motor speed control without the use of high-resolution sensors.

BRIEF SUMMARY OF INVENTION

In the disclosed embodiment, the present method and apparatus alleviate the drawbacks described above with respect to known control strategies for permanent magnet motors by employing algorithms that estimate motor speed. The present method and apparatus utilize a series of nested loops to give the power signals a uniform ground reference with associated signal stability and signal noise reduction.

The control strategy of the present method and apparatus is useful for high performance equipment, including but not limited to fuel cells, compressors, blowers and the like. High performance equipment requires very accurate speed control with limited information and good dynamic response. Other motor control strategies do not allow such good performance with limited information. By providing good performance with limited information, cost is driven down, e.g., a very robust and very expensive sensor is no longer needed.

In contrast to the prior art, the control strategy of the present method and apparatus allows the substitution of an estimated motor voltage for an actual measured speed of a permanent magnet motor. By utilizing an estimated motor voltage, a less expensive speed sensor having only coarse resolution may be utilized. Additionally, the estimated voltage is more reliable than the measured speed.

Three nested control loops determine the estimated voltage. The outermost control loop is a speed regulator. Generally, an external speed command $\omega^*$ (for rotational speed) is provided to the control system, e.g., from a fuel cell controller. This is compared to a speed measurement $\omega$, which is very slow, creating a speed error. The speed regulator functions to drive this error to zero. This loop must operate at a low repetition rate due to the limitations of the available speed measurement.

The output of the speed regulator is an outer loop voltage command $V^*$, which is compared against a motor voltage V measured in the second control loop, a voltage regulator loop. The voltage regulator loop operates at a higher rate than the speed regulator loop because the feedback quantity is a higher bandwidth signal than the speed measurement. The voltage regulator likewise attempts to drive the error to zero, producing a current command $I^*$.

The last loop, a current regulator loop, takes the current command $I^*$ and measures the physical current and calculates the desired instantaneous motor voltage required to synthesize the commanded current. This instantaneous voltage is integrated or averaged and fed back as the measured motor voltage (inner loop voltage command feedback signal) that is used by the voltage regulator.

Compensation for changing bus voltage is also provided in the form of a feed forward voltage function. The feed forward voltage function is provided to ensure a steady state and calculate the terminal voltage of the motor based upon the speed command. A pulse width modulator and inverter is provided which is comprised of a set of switches that will, over some period of time, average the value of the voltage that is applied. For example, suppose the system commands 50 volts. If the bus voltage is 200, a 25% duty cycle is commanded. With 25% of 200 and 75% of zero, the average over time is 50 volts.

The system advantageously allows the use of a low resolution speed measurement in high performance applications. The voltage regulator loop provides a very good substitute for the motor speed measurement as it has relatively high bandwidth compared to the available physical measurement. The voltage regulator loop also has constant dynamics, unlike a speed sensor that typically has quantization difficulty at high speeds and delay problems at low speeds.

The general beneficial effects described above apply generally to each of the exemplary descriptions and characterizations of the devices and mechanisms disclosed herein. The specific structures through which these benefits are delivered will be described in detail herein below.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding an actual shape of the particular elements, and are solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with dispensing apparatus, actuators, motors, motor controllers, processors and automated systems and devices have not been shown or described in detail to avoid unnecessarily obscuring descriptions of the embodiments of the invention.

Unless the context requires otherwise, throughout the specification and claims which follow, the word "comprise" and variations thereof, such as "comprises" and "comprising" are to be construed in an open, inclusive sense, that is as "including, but not limited to."

The headings provided herein are for convenience only and do not interpret the scope or meaning of the claimed invention.

Figure 1:
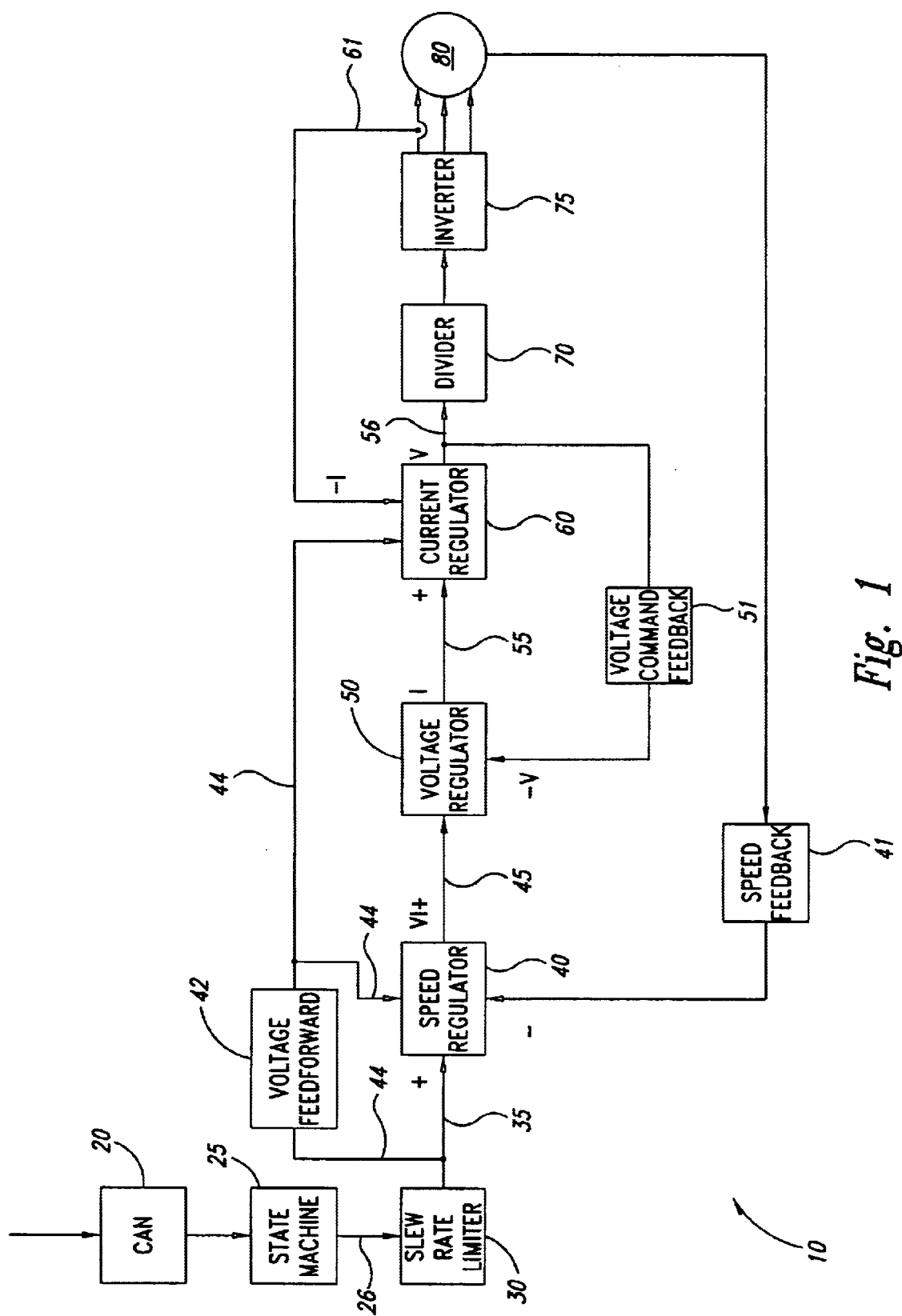
FIG. 1 is an overall functional block diagram for a drive controller according to one illustrated embodiment of the present method and apparatus.
Figure 4:
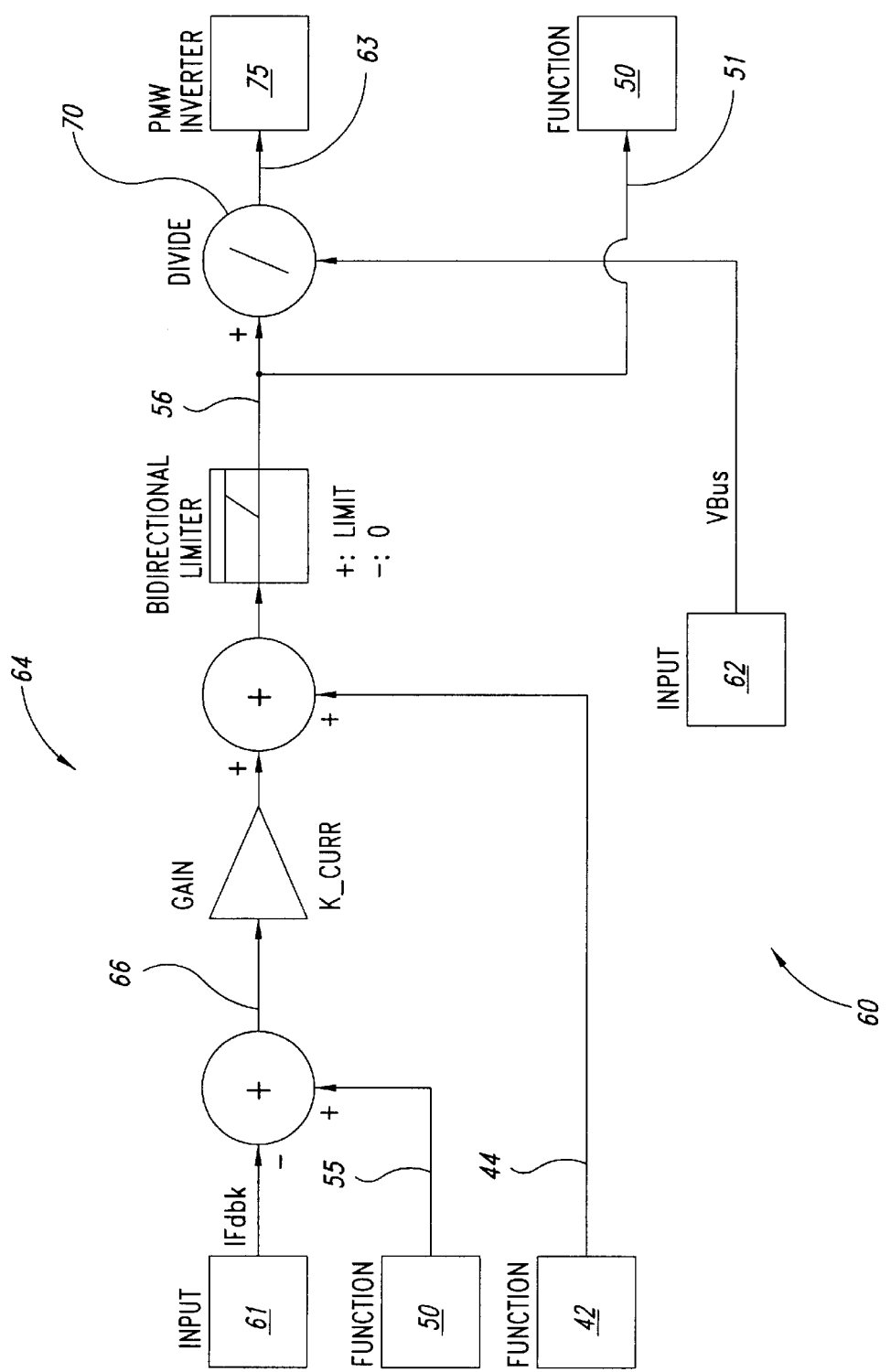
FIG. 4 is a block diagram of one embodiment of the current regulator according to one illustrated embodiment of the present method and apparatus.

FIG. 1 illustrates an overall control strategy for a drive controller system 10. A controller area network (CAN) 20 accepts commands, including commands turning the controller ON or OFF, from an external device (not shown), such as a fuel cell control unit. The ON/OFF command is passed to a state machine function 25 that supplies an enable signal to an optional slew rate limiter 30. The slew rate limiter 30 processes a speed command 26 from the external device and passes the slew rate limited speed command 35 to a speed regulator function 40. The output of the speed regulator function 40 is an outer loop voltage command 45 that is then passed to a voltage regulator function 50. The output of the voltage regulator function 50 is a current command 55 that a current regulator function 60 uses to generate pulse width modulator (PWM) commands (upper and lower phases) for driving an inverter 75 (FIG. 4). The commutation of the PWM to the inverter switches may be done in a Programmable Logic Device (PLD) in order to minimize the lag between positioned measurement and commutation that may otherwise result in reduced drive system capability and increased torque ripple. These PWM commands then set the motor drive 80.

As indicated above, the CAN 20 receives commands from an external device and passes the commands to the state machine function 25 that controls the overall operation of the drive controller system 10. The CAN 20 may also receive feedback data from other auxiliary modules, package the data into a single feed back message, and send the message back to the external device. Also, the CAN 20 may be responsible for generating diagnostics relative to the operation of the CAN 20, e.g., missed messages. In one embodiment, the CAN 20 may function at a rate in the range of 10 ms to 100 ms (10 Hz to 100 Hz), with one or more inputs and one or more calibratable parameters.

The state machine function 25 controls the overall sequential operation of the motor drive 80. As such, it takes inputs from many other functions. The main output of the state machine function 25 is an enable signal that both turns on the PWM outputs to the inverter 75 (FIG. 4) and turns on the speed regulator 40 via the slew rate limiter 30.

While the various functions may be implemented using discrete components, the drive controller system 10 may employ an integrated circuit for some or all of the functions, such as a microprocessor, application specific integrated circuit (ASIC), programmable logic array (PLA) or other integrated device.

Figure 2:
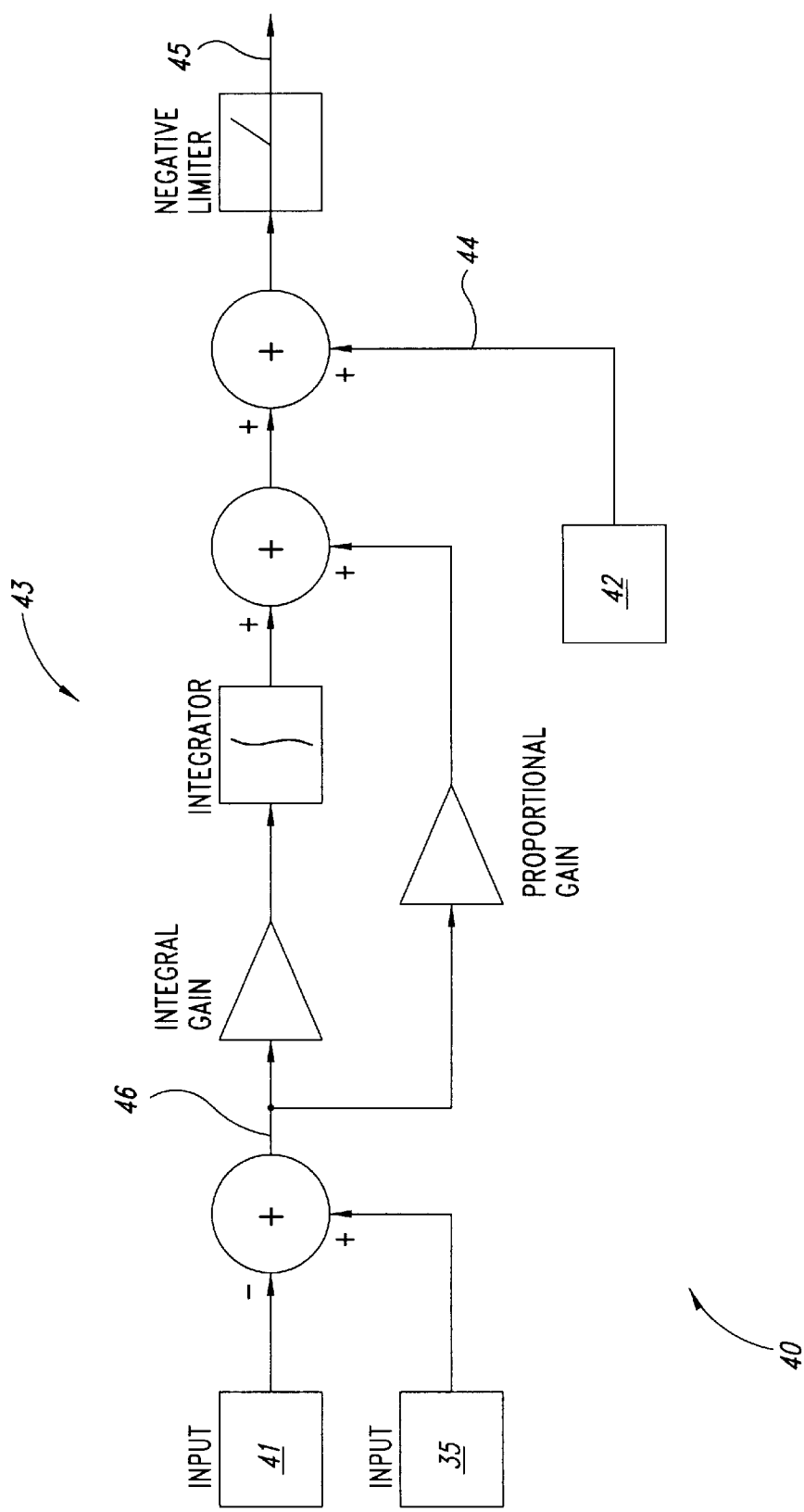
FIG. 2 is a block diagram of one embodiment of the speed regulator according to one illustrated embodiment of the present method and apparatus.

FIG. 2 shows one illustrated embodiment of a speed regulator 40 which may take the form of a subsystem of the drive controller system 10. The speed regulator 40 sums an actual measurement of speed (i.e., speed feedback 41) and the speed command (speed command 26 from the external device 26 or slew rate limited speed command 35) to calculate a speed error 46. The speed feedback 41 may, for example, be the actual drive speed of a compressor. The speed regulator determines the outer loop voltage command 45 from the speed error 46 and provides the outer loop voltage command 45 to the voltage regulator 50. Since motor voltage is generally proportional to the motor speed, the speed regulator 40 may employ a Proportional/integral (PI) speed controller 43 to generate the outer loop voltage command 45. The speed regulator 40 may also sum a feedforward term 42 with the output of the PI speed controller 43 to reduce the effort required by the PI controller 43. The speed regulator 40 may further generate diagnostic information.

Examples of inputs into the speed regulator include speed feedback 41, slew rate limited speed command 35 (e.g., speed ramp), and voltage feedforward 42. Speed feedback 41 represents the actual measured speed. Voltage feedforward 42 represents the feed forward voltage. Outputs from the speed regulator 40 include outer loop voltage command 45, which represents the reference or command voltage. Preferably, the speed regulator 40 functions at a rate slower than the voltage regulator 50.

Figure 3:
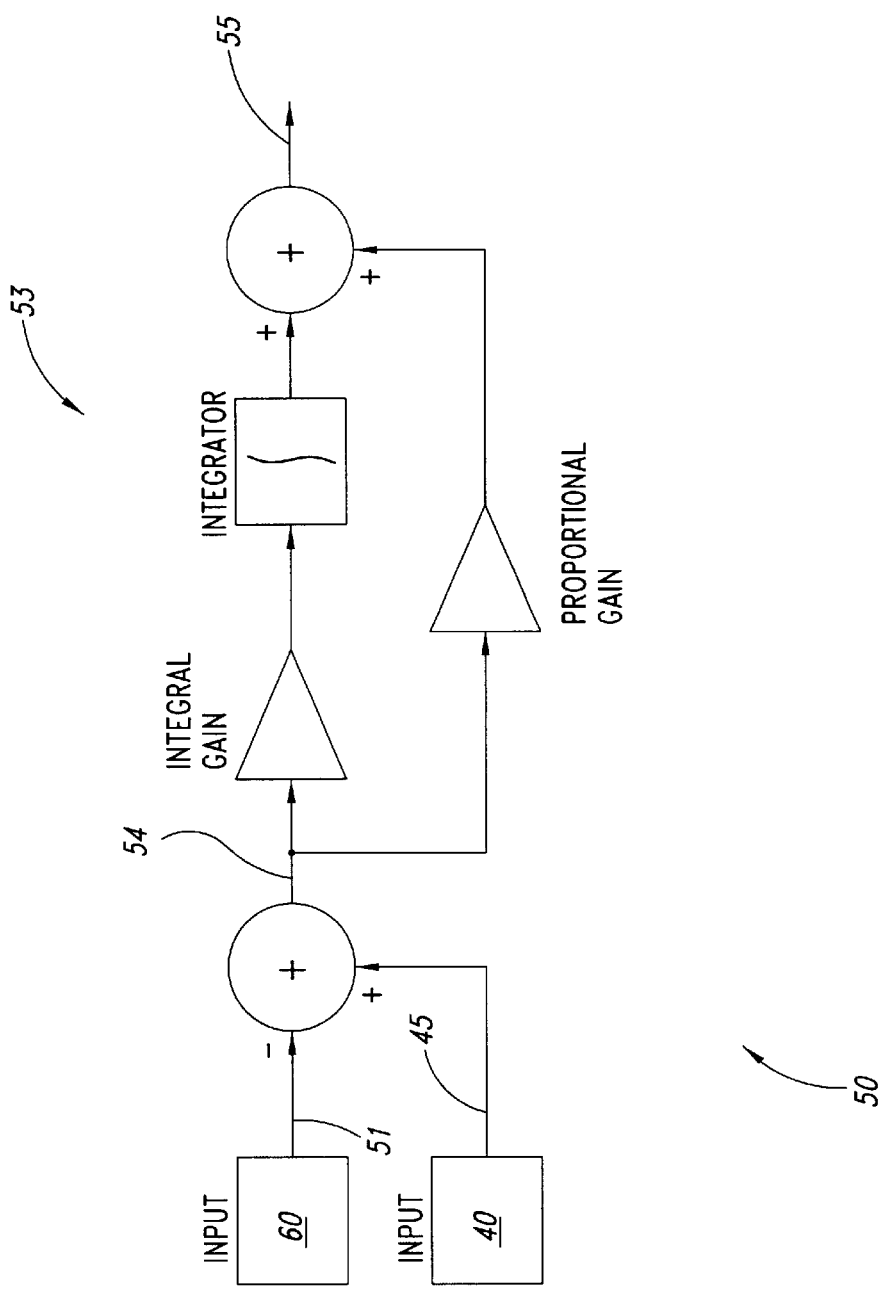
FIG. 3 is a block diagram of one embodiment of the voltage regulator according to one illustrated embodiment of the present method and apparatus.

FIG. 3 shows one illustrated embodiment of a voltage regulator 50 which may take the form of a subsystem of the drive controller system 10. The voltage regulator 50 controls the motor voltage. In general, motor speed is proportional to motor voltage. Though there is no motor voltage sensor, motor voltage may be estimated by averaging the inner loop voltage command feedback 51 of the current regulator 60, preferably in the voltage measurement function 62 (FIG. 4). As an intermediate step, the voltage regulator 50 sums the outer loop voltage command 45 and inner loop voltage command feedback 51 to determine a voltage error 54. The output of the voltage regulator 50 is the current command 55. The voltage regulator 50 employs a PI voltage controller 53 to generate the current command 55. Due to the topology of the inverter and commutator there is only one phase current, which is always considered to be positive.

The voltage regulator 50 preferably functions at a rate faster than the speed regulator 40 but slower than the current regulator 60. The inputs to the voltage regulator 50 include, but are not limited to, a inner loop voltage command feedback 51, the outer loop voltage command 45, and, in one embodiment, a current limiter (not illustrated). The inner loop voltage command feedback 51 is the estimated motor voltage provided by the voltage measurement function 62. The outer loop voltage command 45 is the reference or command voltage provided by the speed regulator 40. Current limit is the instantaneous phase current limit provided by a dynamic current limiter function. Outputs of the voltage regulator 50 include, but are not limited to, a current command 55, the reference or current command that is sent to the current regulator function 60.

FIG. 4 shows one illustrated embodiment of the current regulator 60 which may take the form of a subsystem of the drive controller system 10. The current regulator 60 is responsible for the regulation of the motor current 61. Permanent magnet motors typically have low inductance. Accordingly, the current regulator 60 should have a very high bandwidth and therefore should execute very rapidly. In its simplest sense, the current regulator 60 is a proportional regulator where the gain is increased with speed in order to compensate for reduced forcing voltage, or bus voltage 62 less back emf. Preferably, a feed forward term 44 is included in order to eliminate the need for an integral in the loop. As an intermediate step the current regulator 60 sums the measured motor phase current 61 and the current command 55 to determine a current error 66. The inner loop voltage command 56 of the current regulator 60 is preferably integrated for use as inner loop voltage command feedback 51 in the voltage regulator 50. The bus voltage 62 should be greater than the dynamic motor voltage limit, thereby ensuring that the motor voltage calculation is accurate. The portion labeled 63 for the modulation index serves to drop small pulses when the modulation index is almost equal to 1.

The current regulator 60 preferably functions at a rate that is faster than the voltage regulator 50. Inputs into the current regulator 60 include, but are not limited to, the reference or phase current command 55 provided by the voltage regulator 50; the measured motor phase current 61 provided from the current measurement; the feedforward motor voltage 44 provided by the feedforward voltage function 42; a dynamic motor voltage limit from a dynamic voltage limiter; the filtered, scaled inverse of the bus voltage 62 provided by the bus voltage measurement function; the measured motor speed feedback 41; a signal to reset the voltage integrator; and the drive enable command provided by the state machine 25. Outputs from the current regulator 60 include, but are not limited to, the modulation index 63 that is sent to the PWM output function 75, preferably having a range of 0.5 to 1.0, and the integrated inner loop voltage command feedback 51, which is supplied to the voltage regulator 50.

In operation, the above-described components provide a process for speed control for a motor drive 80 with limited position information. Each of the above subsystems or regulators 40, 50, 60 function as a respective control loop, with the current regulator loop 60 nested inside the voltage regulator loop 50, and the voltage regulator loop 50 nested inside the speed regulator loop 40.

Beginning with the speed regulator loop, a speed command 35 and measured speed (i.e., speed feedback 41) are input into the loop in order to calculate a reference voltage or outer loop voltage command 45. The speed command 35 is provided from an external device such as a fuel cell unit. The measured speed (i.e., speed feedback 41) is provided from the motor drive 80. Both inputs are provided to a proportional/integral controller 43 in order to calculate the outer loop voltage command 45. A feedforward voltage function 42 may provide a feedforward motor voltage 44 which is summed with the output of the PI controller 43 in order to reduce the effort required by the controller 43. In one embodiment, the feedforward voltage function 42 may also provide diagnostics.

The outer loop voltage command 45 from the speed regulator loop is then input to the voltage regulator loop along with an estimated inner loop voltage command feedback 51 in order to determine a reference current or phase current command 55. As there is no motor voltage sensor, inner loop voltage command feedback 51 is estimated by averaging the inner loop voltage command 56 of the current regulator 60. Utilizing another proportional/integral controller 53, the two inputs provide the reference current or phase current command 55.

The phase current command 55 from the voltage regulator loop is combined with the current measurement 61 in a proportional controller 64. The output from the proportional controller 64 is added with the feedforward motor voltage 44 in order to eliminate the need for an integral within this control loop. The output may then be integrated in order to provide the inner loop voltage command feedback 51 for use in the voltage regulator loop. A divider 70 divides the output by the voltage measurement function 62 for providing a modulation index value 63 for input into the pulse width modulator 75 (upper and lower phases), which is then commutated to the inverter switches of the motor drive. The commutation is preferably performed within a programmable logic controller.

Although specific embodiments of an examples for the motor control apparatus and methods are described herein for illustrative purposes, various equivalent modifications can be made without departing from the spirit and scope of the invention, as will be recognized by those skilled in the relevant art. The teachings provided herein of the invention can be applied to other motor control apparatus and methods, not necessarily the permanent magnet motor control apparatus and method generally described above.

The various embodiments described above can be combined to provide further embodiments. All of the above U.S. patents, U.S. patent applications and publications referred to in this specification are incorporated herein by reference, in their entirety. Aspects of the invention can be modified, if necessary, to employ systems, circuits and concepts of the various patents, applications and publications to provide yet further embodiments of the invention. These and other changes can be made to the invention in light of the above detailed description. In general, in the following claims, the terms used should not be construed to limits the invention to the specific embodiments disclosed in the specification and the claims, which should be construed to include all motor control apparatus that operate in accordance with the claims. Accordingly, the invention is not limited by the disclosure, but instead its scope is to be determined entirely by the following claims.

What is claimed is:

1. A system to control a permanent magnet motor based on a speed command representing a desired operating speed and a motor current feedback signal from a motor current sensor, the system comprising:

a speed regulation subsystem coupled to receive the speed command and a speed feedback signal representing an estimated operating speed of the permanent magnet motor, and configured to provide an outer loop voltage command based on at least the speed command and the speed feedback signal;

a voltage regulation subsystem coupled to receive the outer loop voltage command from the speed regulation subsystem and an inner loop voltage command feedback signal representing an estimated motor voltage, and configured to provide a current command based at least in part on the outer loop voltage command and the inner loop voltage command feedback signal; and a current regulation subsystem coupled to receive the current command from the voltage regulation subsystem and the motor current feedback signal from the motor current sensor, and configured to provide an inner loop voltage command and the inner loop voltage command feedback signal based at least in part on the current command and the motor current feedback signal.

2. The control system of claim 1 wherein the voltage regulation subsystem operates at a first rate and the speed regulation subsystem operates at a second rate higher than the first rate.

3. The control system of claim 1 wherein the voltage regulation subsystem operates at a first rate, the speed regulation subsystem operates at a second rate higher than the first rate, and the current regulation subsystem operates at a third rate higher than the second rate.

4. The control system of claim 1 wherein the speed regulation subsystem comprises a speed regulation proportional/integral controller.

5. The control system of claim 1 wherein the speed regulation subsystem provides the outer loop voltage command based on a difference between the speed command and the speed feedback signal.

6. The control system of claim 1 wherein the speed regulation subsystem provides the outer loop voltage command based on a difference between at least the speed command and the speed feedback signal and further based on a voltage feed forward signal.

7. The control system of claim 1 wherein the speed regulation subsystem comprises a speed regulation proportional/integral controller coupled to integrate a difference between the speed command and the speed feedback signal and a negative limiter coupled to limit a difference between a result of the integration and a voltage feed forward signal.

8. The control system of claim 1 wherein the voltage regulation subsystem comprises a voltage regulation proportional/integral controller.

9. The control system of claim 1 wherein the voltage regulation subsystem provides the current command based on a difference between the inner loop voltage command and the inner loop voltage command feedback signal.

10. The control system of claim 1 wherein the current regulation subsystem comprises a current regulation proportional/integral controller.

11. The control system of claim 1 wherein the current regulation subsystem provides the motor current voltage feedback signal based on a difference between the current command and the motor current feedback signal.

12. The control system of claim 1 wherein the current regulation subsystem provides the motor current feedback signal based on a determined difference between the current command and the motor current feedback signal, and further based on a determined difference between the determined difference between the current command and the motor current feedback signal and a voltage feed forward signal.

13. The control system of claim 1 wherein the speed regulation, voltage regulation and current regulation subsystems are implemented in an integrated circuit.

14. The control system of claim 1, further comprising:
an inverter coupled to receive a modulation index from the current regulation subsystem and to provide a controlled current to the permanent magnet motor in response.

15. A method to control a permanent magnet motor based on a speed command representing a desired operating speed and a motor current feedback signal from a motor current sensor, the method comprising:
determining an outer loop voltage command based on at least a speed command and a speed feedback signal representing an estimated operating speed of the permanent magnet motor;
determining a current command based at least in part on the outer loop voltage command and an inner loop command feedback signal representing an estimated motor voltage; and
determining the inner loop voltage command feedback signal based at least in part on the current command and the motor current feedback signal.

16. The method of claim 15 wherein the determining an outer loop voltage command occurs at a first rate and the determining a current command occurs at a second rate higher than the first rate.

17. The method of claim 15 wherein the determining an outer loop voltage command occurs at a first rate, the determining a current command operates at a second rate higher than the first rate, and the determining the inner loop voltage command feed back signal occurs at a third rate higher than the second rate.

18. The method of claim 15 wherein determining an outer loop voltage command includes determining a difference between the speed command and the speed feedback signal.

19. The method of claim 15 wherein determining an outer loop voltage command includes determining a difference between the speed command and the speed feedback signal and further determining a difference between a voltage feed forward signal and the determined difference between the speed command and the speed feedback signal.

20. The method of claim 15 wherein determining an outer loop voltage command includes integrating a difference between the speed command and the speed feedback signal, and negative limiting a difference between a voltage feed forward signal and a result of the integration.

21. The method of claim 15 wherein determining the current command includes determining a difference between the outer loop voltage command and the inner loop voltage command feedback signal.

22. The method of claim 15 wherein determining the inner loop voltage command feedback signal includes determining a difference between the current command and the motor current feedback signal.

23. The method of claim 15 wherein determining the inner loop voltage command feedback signal includes determining a difference between the current command and the motor current feedback signal, and further determining a difference between a voltage feed forward signal and the determined difference between the current command and the motor current feedback signal.

24. The method of claim 15, further comprising:
determining a modulation index based at least in part on a difference between the current command and the motor current feedback signal; and
providing the modulation index to an inverter.

25. The method of claim 15, further comprising:
determining a modulation index based at least in part on a difference between the current command and the motor current feedback signal;
providing the modulation index to an inverter; and
selectively supplying power from the inverter to the motor based on the modulation index.

26. A motor control system to control a permanent magnet motor based on a speed command representing a desired operating speed and a motor current feedback signal representing a current supplied to the permanent magnet motor, the motor control system comprising:
a speed regulator operating at a first rate;
a voltage regulator operating at a second rate, faster than the first rate; and
a current regulator, wherein
the speed regulator is coupled to provide an outer loop voltage command to the voltage regulator, where the outer loop voltage command is a function of a variation between the speed command and a speed feedback signal representing an estimated operating speed of the permanent magnet motor;

the voltage regulator is coupled to provide a current command to the current regulator, where the current command is a function of a variation between the outer loop voltage command and an inner loop voltage command feedback signal representing an estimated motor voltage; and the current regulator is coupled to provide the inner loop voltage command feedback signal to the voltage regulator where the inner loop voltage command feedback signal is a function of a variation between the current command and the motor current feedback signal.

27. The motor control system of claim 26, further comprising:

a motor current sensor coupled to provide the motor current feedback signal to the current regulator.

28. The motor control system of claim 26, further comprising:

a pulse width modulation inverter having a duty cycle controlled according to an inner loop current command provided by the current regulator.

29. The motor control system of claim 26 wherein the speed regulator, the voltage regulator and the current regulator are at least partially implemented in an integrated circuit.

30. The motor control system of claim 26 wherein the current regulator operates at a third rate, faster than the second rate.

31. A system to control a permanent magnet motor based on a speed command representing a desired operating speed and a motor current feedback signal from a motor current sensor, the system comprising:

speed regulation means for determining an outer loop voltage command based on at least a speed command and a speed feedback signal representing an estimated operating speed of the permanent magnet motor;

voltage regulation means for determining a current command based at least in part on the outer loop voltage command and an inner loop voltage command feedback signal representing an estimated motor voltage; and current regulation means for determining the inner loop voltage command feedback signal based at least in part on the current command and the motor current feedback signal, wherein the voltage regulation means operates at a first rate and the speed regulation means operates at a second rate higher than the first rate.

32. A method to control a permanent magnet motor based on a speed command representing a desired operating speed and a motor current feedback signal representing a current supplied to the permanent magnet motor, the motor control system comprising:

operating a speed regulator loop at a first rate;

operating a voltage regulator loop at a second rate, faster than the first rate; and operating a current regulator loop, wherein operating the speed regulator loop includes providing an outer loop voltage command to the voltage regulator loop, where the outer loop voltage command is a function of a variation between the speed command and a speed feedback signal representing an estimated operating speed of the permanent magnet motor;

operating the voltage regulator loop includes providing a current command to the current regulator loop, where the current command is a function of a variation between the outer loop voltage command and an inner loop voltage command feedback signal representing an estimated motor voltage; and operating the current regulator loop includes providing the inner loop voltage command feedback signal to the voltage regulator loop where the inner loop voltage command feedback signal is a function of a variation between the current command and the motor current feedback signal.

33. The method of claim 32 wherein the voltage command is further a function of a voltage feed forward signal.

34. The method of claim 32 wherein the inner loop voltage command feedback signal is further a function of a voltage feed forward signal.

35. The method of claim 32 wherein operating the current regulator loop, operating the speed regulator loop and operating the voltage regulator loop includes executing a number of defined operations in an integrated circuit.

36. The method of claim 32, further comprising:

supplying control signals to an inverter based on an inner loop voltage command output by the current regulator loop.

37. The method of claim 32 wherein the function of a variation between the speed command and a speed feedback signal is a proportional-integral function thereof.

38. The method of claim 32 wherein the function of a variation between the outer loop voltage command and the inner loop command feedback signal is a proportional-integral function thereof.

39. The method of claim 32 wherein the function of a variation between the current command and the motor current feedback signal is a proportional function thereof.

* * * * *